Figure 1:
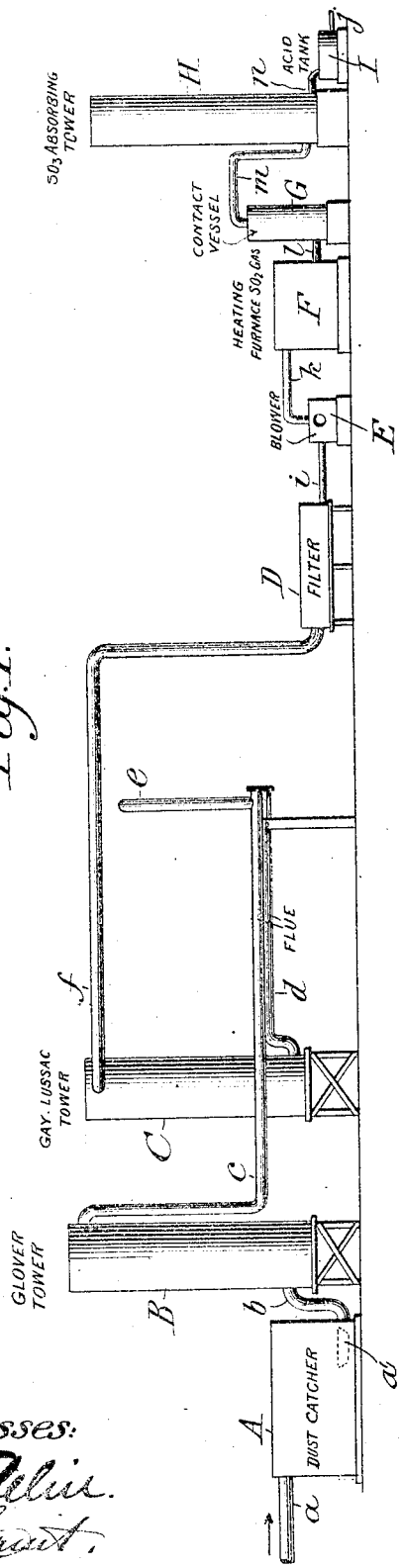

No. 875,909. PATENTED JAN. 7, 1908.
N. L. HEINZ & M. F. CHASE.
MANUFACTURE OF SULFURIC ACID.
APPLICATION FILED APR. 3, 1906.

Witnesses:

Inventors;

UNITED STATES PATENT OFFICE.

NICHOLAS L. HEINZ, OF LA SALLE, ILLINOIS, AND MARCH F. CHASE, OF MINERAL POINT, WISCONSIN.

MANUFACTURE OF SULFURIC ACID.

No. 875,909.  Specification of Letters Patent.  Patented Jan. 7, 1908.

Application filed April 3, 1906. Serial No. 309,580.

*To all whom it may concern:*

Be it known that we, NICHOLAS L. HEINZ and MARCH F. CHASE, both citizens of the United States, residing at La Salle, county of Lasalle, State of Illinois, and Mineral Point, county of Iowa, State of Wisconsin, respectively, have invented certain new and useful Improvements in Manufacture of Sulfuric Acid; and we do hereby declare the following to be a full, clear, and exact description of the invention, such as will enable others skilled in the art to which it appertains to make and use the same.

Our invention relates to certain new and useful improvements in the manufacture of sulfuric acid, the purpose of the invention being to so treat the burner gases, on their way to the contact vessel or vessels, as to present them in a form peculiarly adapted for catalytic action and for the subsequent absorption of their sulfuric anhydrid and, at the same time, to produce from the burner gases, in the flue system, an additional quantity of sulfuric acid which will also serve to supply the quantity of absorbing acid required, necessary for the operation of the several towers of the plant. To this end, we combine with the ordinary contact or catalytic process, a preliminary treatment of the burner gases, which consists in passing them consecutively through a dust-catcher, a Glover tower, a flue system in which a portion of the gases are converted into sulfuric acid (preferably of different strengths), and a Gay-Lussac tower, before passing on to the filter, blower, heating furnace, contact vessel and absorbing tower of the contact apparatus. As a consequence of this preliminary treatment of the burner gases, they are deprived of their dust, the sulfuric acid mists present are converted into liquid sulfuric acid, and impurities are either thrown down in the form of solid precipitates (such as arsenic compounds), or are absorbed by the weak acid which would otherwise tend to interfere with the efficiency of the contact material. The amount of sulfuric acid produced in the flue system is so proportioned to the amount of sulfuric acid produced in the contact apparatus, as to realize an increased output per unit of niter employed, and permits the maintenance of the contact apparatus, during a long continued period, in a state of high efficiency.

Steam and nitric acid or other nitrous compounds are admitted into the flue system, and the flue system is associated with the Glover tower and the Gay-Lussac tower, in analogy to the association of such towers with the lead chambers of the chamber process of making sulfuric acid, one portion of the acid produced in the flue system being employed for diluting the acid supplied from the Gay-Lussac tower to the Glover tower, and another portion of the acid produced in the flue system being added to the tank which receives the acid from the absorbing tower of the contact process, which tank supplies said absorbing tower, and (in conjunction with the Glover tower) supplies the Gay-Lussac tower also. The plant therefore produces within itself all of the acid necessary for carrying on the functions of the individual towers, the subdivision of the flue system thus permitting the production in its constituent parts of acid of different strengths, appropriate to the several particular uses of the plant, as will hereinafter more fully appear. The surplus, representing the effective or commercial output of the plant, goes to the storage receptacle.

In the accompanying drawings, we have illustrated diagrammatically, the apparatus which we prefer for carrying our invention into effect. However, we do not limit ourselves to this particular form of apparatus.

Figure 2:
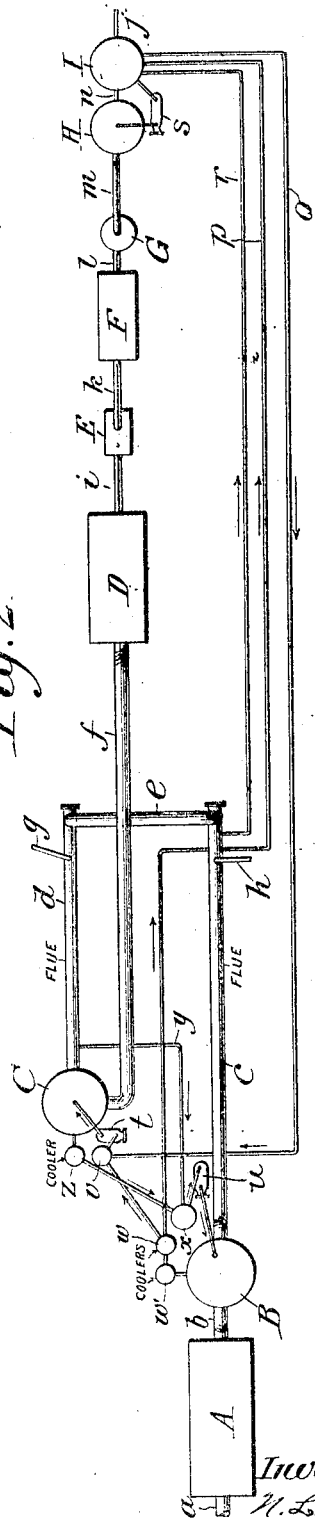

Figure 1 represents said apparatus in elevation with the omission of the coolers and their tanks, the acid-eggs, and the several sulfuric acid conduits intermediate of the coolers, leading from tanks and acid-eggs to the towers; Fig. 2 represents a plan view, with these auxiliaries supplied.

Similar letters of reference indicate similar parts in both views.

Referring to the drawing, *a* indicates the conduit leading from the pyrites or blende furnace which conveys the burner gases therefrom. The conduit *a* opens into a dust-chamber A of any suitable type, wherein the greater part of the dust settles, and which may conveniently contain a niter pot or box *a'*, as shown, arranged in convenient proximity to the outlet pipe *b* leading from the dust-catcher to the Glover tower B. The flue system characteristic of our invention is indicated by the letters *c, d*, joined by the arched connecting pipe *e*. Into these flues *c, d*, extend the steam inlet pipes *h, g*, and the two flues are preferably separated from each other, so that each may receive its individual supply of steam, and so that the one will not discharge its acid into the other. By this expedient, we are enabled, by varying the quantity of steam admitted into the respective flues, to obtain acid of different degrees of concentration therein, as desired. The pipes $h$, $g$, or similar pipes, may likewise serve for the injection of the desired quantities of nitric acid or other nitrous compound requisite for oxidizing the $SO_2$ in the flues $c$, $d$, to the extent desired.

The flue $d$ enters the bottom of the Gay-Lussac tower C, and, from the Gay-Lussac tower, a conduit $f$ conveys the gases to the filter D. From the filter D, they enter the blower E, through the conduit $i$, and from the blower they enter the heating furnace F through the conduit $k$. Thence, by the conduit $l$, they enter the contact vessel G which contains the usual filling of catalytic material or contact mass. From the contact vessel G, the gases finally pass by the conduit $m$ into the absorbing tower H, wherein the $SO_3$ is finally converted into sulfuric acid, which is discharged from the pipe $n$ into the acid tank I.

The operation of the invention will be apparent. The main portion of the dust present in the burner gases, will be deposited in the dust catcher A, and the hot gases, still containing a portion of their dust, will rise through the Glover tower B, together with nitrogen compounds from the niter pot $a'$, and, being exposed therein to contact with the down trickling finely divided nitrous vitriol, admitted at the top of the tower B, will serve (by reason of the heat contained in the gases), to de-nitrate the nitrous vitriol, or nitroso-sulfuric acid, and, at the same time, will heat and concentrate the acid. The gases will be correspondingly cooled by interchange of temperature with the cooler acid. The Glover tower receives its nitrous vitriol from the tank $x$ and acid-egg $u$, the supply to the tank $x$ being derived from the cooler $z$ of the Gay-Lussac tower C, and from the weaker acid of the flue $d$, the diluted mixture in the tank being so proportioned as to be of a density of about 58° Baumé. From the Glover tower, the cooled gases enter the first subdivision $c$ of the flue system, and are subjected therein to the action of nitric acid, or other nitrous compounds, and to the action of steam. They are similarly treated, but with a larger quantity of steam, in the second subdivision $d$ of the flue system, the arched connecting pipe $e$ permitting the gases to pass from the flue $c$ to the flue $d$, but preventing admixture of the acids made in the two subdivisions. It is, therefore, feasible to make acid in one of the subdivisions, different in strength from the acid made in the other subdivision of the flue system; and, in fact, the stronger acid made in the flue $c$, instead of being supplied to the Glover tower, is led by the conduit $r$ to the tank I, where it mingles with the acid received from and supplied to the absorbing tower H by the contact apparatus, which is maintained at a density of about 66° Baumé. Acid from the tank I is supplied by the acid-egg $s$ to the absorbing tower H, referred to, and is also supplied through the conduit $o$, to the tank $v$ which supplies the acid-egg $t$ of the Gay-Lussac tower C, another portion of the acid supplied to said tank $v$ being derived from the coolers $w$, $w'$, of the Glover tower B. The proportions of the acid thus supplied to the tank $v$, are so established as to make up a mixture of strong acid therein, i. e. of acid of a density of 66° Baumé. The surplus acid from the coolers $w$, $w'$ of the Glover tower, is led by the conduit $p$ to the tank I, and the effective output of the plant, with the apparatus arranged as shown, passes off, through the conduit $j$, to the storage vats or tanks.

In the flue system, practically all of the sulfuric acid mist present in the gases, is converted into liquid sulfuric acid, by the action of the steam and niter, and, in this way, this mist is readily and effectually recovered in the preliminary treatment of the gases. This is of great importance, from a practical standpoint, as it is well known that the recovery of sulfuric acid mists by mere settling in a flue or lead chamber, or even by the most energetic wet and dry scrubbing of the gases containing them, is a matter of the greatest difficulty. Furthermore, in this preliminary treatment, the employment of a stronger acid than one of 60° Baumé in the Gay-Lussac tower, permits all of the nitrogen compounds to be much more readily absorbed than with 60° Baumé acid. This results in an additional saving of niter, so that the preliminary treatment of the gas involves but an exceedingly slight loss, if any, of niter per pound of sulfuric acid made, in the flue system. Moreover, we find that, as compared with the ordinary chamber process, a proportionately larger amount of $SO_2$, per unit of niter, can be converted into $H_2SO_4$, in the flue system, provided the oxidation therein is not carried too far; that is, the burner gases, as they take their exit from the flues $c$ and $d$, should still contain a comparatively large amount of $SO_2$, say, for instance, 80% of their original volume of $SO_2$.

The burner gases, freed from practically all of their sulfuric acid mists, dust, and the greater part of such other impurities as are capable of being removed in the flue system, issue from the Gay-Lussac tower through the conduit $f$, and pass through the filter D, packed with asbestos, or the like, which deprives them of any remnant impurities, capable of precipitation or deposition therein. Upon issuing from the filter D, the burner gases carry their burden of purified $SO_2$ through the conduit $i$ into the blower E. From the blower, the gas passes, by the conduit $k$, through the usual retorts of the heating furnace F, and thence, through the connection $l$, into and through the contact vessel G, and finally, by the conduit $m$ into and through the absorbing tower H. In the absorbing tower, the sulfuric anhydrid made in the contact vessel G, is absorbed by sulfuric acid of 66° Baumé, supplied from the tank I, as hereinbefore explained.

By the expedient of converting a proportion of the $SO_2$ into sulfuric acid in the preliminary treatment of the gases, we find that not only is such portion produced at a very small cost, but that the final conversion of $SO_2$ to $SO_3$ in the converter, requires much less platinum, for the reason that the production of the sulfuric acid in the flue system by the action of the steam and nitrogen compounds present therein, effectually removes the impurities which would otherwise interfere with the efficient action of the catalytic material. The economy of the general system is further enhanced by the fact, hereinbefore adverted to, that no outside mixing of the acid required for the operation of the plant is necessary, the acid produced at various points therein, sufficing for all of the uses contemplated.

Having thus described our invention, what we claim is:—

1. The method of making sulfuric acid from burner gases; which consists in treating the burner gases, on their way to the vessels containing the contact or catalytic material, with a nitrous compound and steam, thereby purifying and drying them and converting a portion of their $SO_2$ and $SO_3$ into sulfuric acid, and finally converting the remainder of their $SO_2$ into sulfuric acid by passing the gases into contact with catalytic material and finally into an $SO_3$ absorbing tower; substantially as described.

2. The method of making sulfuric acid from burner gases; which consists in treating the burner gases, on their way to the vessels containing the contact or catalytic material, with a nitrous compound and steam, thereby purifying and drying them, absorbing the niter thus introduced so as to form nitrous vitriol, denitrating the nitrous vitriol so as to form sulfuric acid as a portion of the final product, and obtaining a second portion of the final product by passing the purified and dried gases with their remaining $SO_2$ into contact with catalytic material and finally into an $SO_3$ absorbing tower; substantially as described.

3. The method of making sulfuric acid from burner gases, which consists in passing said gases successively through a Glover tower, a flue system, and a Gay-Lussac tower, and admitting into said flue system, a quantity of a nitrous compound and steam sufficient to convert a portion only of the $SO_2$ present into sulfuric acid and to liquefy in said flue system the sulfuric acid mists present, the amount of steam admitted into one portion of the flue system differing from that admitted into another portion thereof, so as to produce acids of different strengths in the said flue system, appropriate to the elimination of different impurities; substantially as described.

4. The method of making sulfuric acid from burner gases, which consists in passing said gases successively through a Glover tower, a flue system, and a Gay-Lussac tower, admitting into said flue system a quantity of steam and nitric acid sufficient to convert a portion only of the $SO_2$ present into sulfuric acid and to liquefy in said flue system the sulfuric acid mists, and, then passing the gases still containing a considerable residue of $SO_2$ through catalytic material and an $SO_3$ absorption tower, the acid produced in a portion of the flue system being employed to dilute the acid supplied from the Gay-Lussac tower or the Glover tower; substantially as described.

5. The method of making sulfuric acid from burner gases, which consists in passing said gases successively through a Glover tower, a flue system, and a Gay-Lussac tower, admitting into said flue system a quantity of steam and nitric acid sufficient to convert a portion only of the $SO_2$ present into sulfuric acid and to liquefy in said flue system the sulfuric acid mists, and, then passing the gases still containing a considerable residue of $SO_2$ through catalytic material and an $SO_3$ absorption tower, the acid for the Gay-Lussac tower being of more than 60° Baumé and being supplied from the product of $SO_3$ absorption tower diluted by the product of the Glover tower; substantially as described.

In testimony whereof we affix our signatures, in presence of two witnesses.

NICHOLAS L. HEINZ.
MARCH F. CHASE.

Witnesses:
C. W. BLODGETT.
W. G. STARK.